T. O. MARTIN.
TOOL HOLDER.
APPLICATION FILED MAY 7, 1917.
1,304,898.
Patented May 27, 1919.
2 SHEETS—SHEET 1.
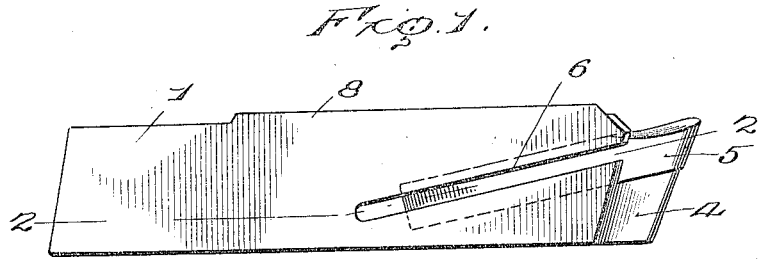
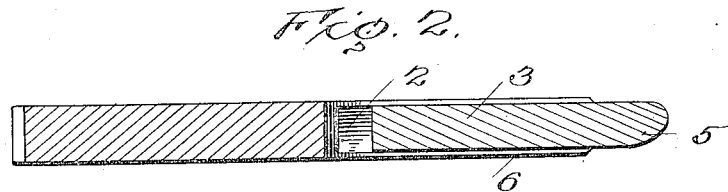
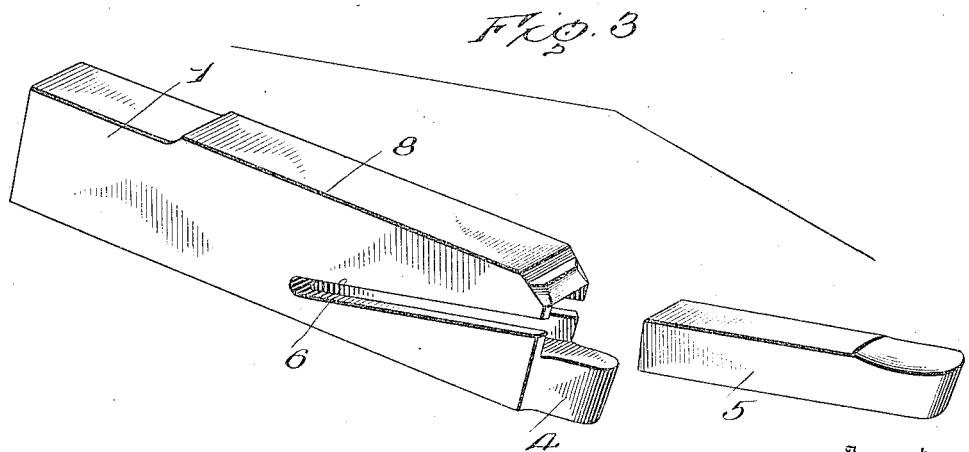
Inventor
T. O. Martin
By
Attorneys T. O. MARTIN.
TOOL HOLDER.
APPLICATION FILED MAY 7, 1917.
1,304,898.
Patented May 27, 1919.
2 SHEETS—SHEET 2.
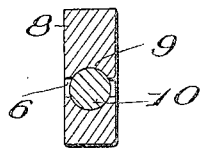
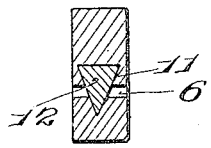
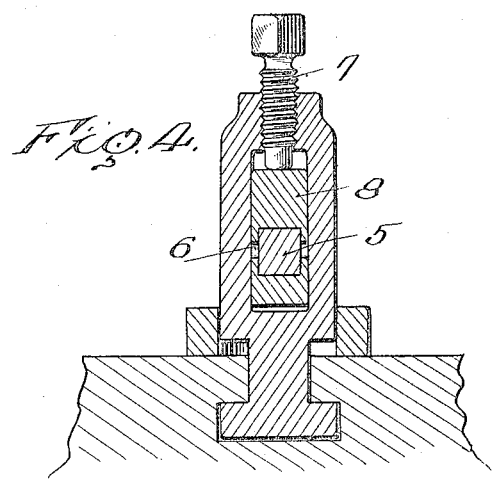
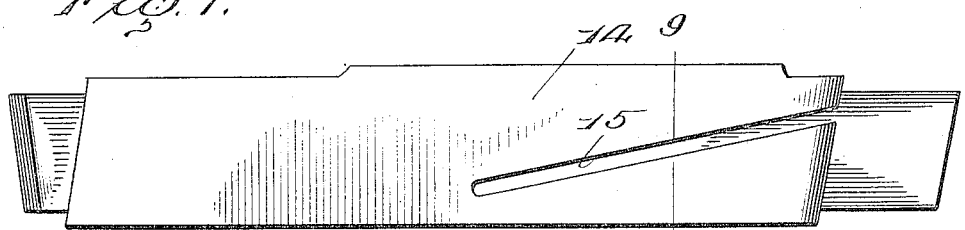
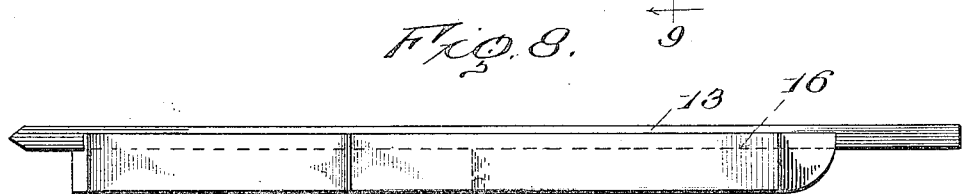
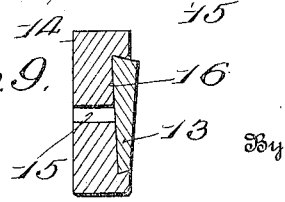
Inventor
T. O. Martin
By
Attorneys

UNITED STATES PATENT OFFICE.

TREVILLIE O. MARTIN, OF JACKSON, TENNESSEE.

TOOL-HOLDER.

1,304,898. Specification of Letters Patent. Patented May 27, 1919.

Application filed May 7, 1917. Serial No. 166,935.

*To all whom it may concern:*

Be it known that I, TREVILLIE O. MARTIN, a citizen of the United States, residing at Jackson, in the county of Madison and State of Tennessee, have invented certain new and useful Improvements in Tool-Holders, of which the following is a specification.

This invention relates to tool holders of that class employed upon metal working lathes and has as one of its objects to provide a tool holder which will hold the tool in a manner to prevent chattering when making deep or heavy cuts. In the ordinary tool holder of this class the tool is fitted into a socket and rests upon the bottom wall thereof, a set screw being threaded through the upper side of the holder to engage the upper side of the tool and when this set screw is tightened the tool will be forced away from the upper wall of the socket and in making heavy or deep cuts it will be vibrated causing chattering and a rough cut. The present invention, therefore, aims to provide a tool holder so constructed that when the tool is fitted into the socket of the holder and the holder is clamped in the tool post of the lathe, the upper and lower walls of the socket will be caused to firmly bind against the corresponding surfaces of the tool so as to effectually prevent chattering and hold the tool firm while making the cut.

Another disadvantage presented by tool holders employing a set screw for clamping the tool in place is that in order to remove the holder from the tool post it is necessary to move the post away from the work and turn the same so as to permit of withdrawal of the holder from the post, as the set screw upon the holder prevents its withdrawal while the post is adjacent the work. The present invention, therefore, has as another object to provide a tool holder which will effectually clamp the tool without the use of a set screw, thereby permitting of the holder being withdrawn from the post without disturbing the post. A further advantage gained by providing a tool holder devoid of a set screw is that the tool may be brought closer to the work than would be possible in the use of the ordinary tool holder and yet the tool may be deeply seated in the socket in the holder.

Another aim of the invention is to so construct the tool holder that the cutting end of the tool will be firmly supported in working position without the holder in any way interfering with the work.

Another aim of the invention is to reinforce the upper side of the tool holder so that the same will not be liable to become worn through the engagement therewith of the set screw of the tool post.

In the accompanying drawings:

Figure 1 is a side elevation of the tool holder embodying the present invention;

Fig. 2 is a sectional view on the line 2—2 of Fig. 1;

Fig. 3 is a perspective view of the holder and tool separated;

Fig. 4 is a vertical transverse sectional view illustrating the holder and tool arranged within the tool post;

Fig. 5 is a vertical transverse sectional view illustrating a modified form of holder;

Fig. 6 is a view similar to Fig. 5 illustrating a further modification of the invention;

Fig. 7 is a side elevation illustrating another modified form of the invention;

Fig. 8 is a sectional view on the line 8—8 of Fig. 7;

Fig. 9 is a vertical transverse sectional view on the line 9—9 of Fig. 7.

The tool holder of the form shown in Figs. 1 to 6, inclusive, comprises a head 1 which may be cut from a suitable bar of steel and which is preferably rectangular in cross section, as shown in Fig. 4. At its forward end the body 1 is formed with a socket indicated by the numeral 2 which is designed to receive the shank of the tool indicated by the numeral 3. In that form of the invention shown in Figs. 1 to 4, inclusive, the socket is rectangular in cross section to conform to the cross sectional shape of the tool. While in the drawings the socket 2 is illustrated as extending downwardly at an angle from the forward end of the holder, it will be understood that it may extend horizontally or in any other direction desired. At its forward end the body 1 is formed with a nose, indicated by the numeral 4, which nose lies wholly below the plane of the bottom wall of the socket but has its upper side or face occupying said plane so as to constitute a continuation of said bottom wall of the socket and by reference to Fig. 1 of the drawings it will be observed that this nose firmly supports the cutting end 5 of the tool. The nose 4 is of a width less than the width of the cutting end of the tool so as not to interfere with the operation of the tool in making the cut. The body 1 is formed with a transverse slot 6. In the present instance the slot 6 extends entirely through both side faces of the body 1 and the upper and lower walls of the slot occupy planes parallel to the upper and lower walls of the socket 2. However, the slot 6 may be so located that its upper and lower walls will be nonparallel to the corresponding wall of the socket, if found desirable. Also the slot 6 may be of a width to extend only through one side wall of the socket if found desirable. By forming the slot 6 in the body 1, the body at its forward end is divided into upper and lower clamping portions and it will be understood that when the tool holder is placed in the tool post, as shown in Fig. 4 of the drawings, and the clamping screw of the post, indicated by the numeral 7, is tightened, the shank of the tool will be firmly clamped between the upper and lower walls of the socket 2 and for a distance substantially throughout the entire length of the said shank, the extreme forward end of the tool resting upon the inclined upper face of the nose 4 and being firmly held thereon by reason of the clamping action exerted by the upper clamping portion of the holder. It will be understood that inasmuch as a set screw is not employed in clamping the tool in the holder, the tool may be readily withdrawn from the tool post without changing the position of the post with relation to the work. Also it will be understood that the tool may be adjusted closer to the work and yet be more deeply seated in the socket than would be possible by the use of the ordinary holder. In order to reinforce the upper side of the holder and prevent undue wear thereof through repeated tightening of the set screw upon the tool post, the upper side of the body 1 is preferably provided with a shallow raised portion 8 which, if desired, may be so treated as to harden it.

In that form of the invention shown in Fig. 5 of the drawings the socket, which is indicated by the numeral 9, is cylindrical as also the shank of the tool, indicated by the numeral 10, which is fitted in said socket. It will be understood that due to the particular shape given the socket and tool shank in this form of the invention, the shank is more closely embraced by the walls of the socket than in the previously described forms of the invention and, consequently, there is even less likelihood of chattering.

Another highly satisfactory modification of the structure first described is illustrated in Fig. 6 of the drawings, and in its form the socket is triangular in shape and is indicated by the numeral 11. The tool shank, which is indicated by the numeral 12, is triangular in cross section and it will be apparent that when pressure is exerted upon the upper clamping portion of the holder the lower side of the shank 12 will be wedged into the lower portion of the socket and the said shank will be firmly held against chattering.

In that form of the invention shown in Fig. 7 of the drawings the socket is open at one side, this type of holder being especially adapted for use in holding a tool in the nature of a blade such, for example, as indicated by the numeral 13. In Figs. 7, 8 and 9 the holder is illustrated as comprising a body 14 having a slot 15 formed therein which slot opens through one face of the body and through the inner wall of the tool receiving socket which is indicated by the numeral 16.

Having thus described the invention, what is claimed as new is:

A tool holder comprising a body having a tool receiving socket opening through one end of the body and extending obliquely to the longitudinal axis of the body with its inner end terminating relatively close to the under side of the body, the said body having oppositely located slots formed through its side faces and communicating with the socket and extending substantially opposite and parallel to the axis of the socket and terminating at their inner ends relatively close to the said under face of the body, the slots dividing the body into jaws, the lower one of which is of considerably reduced thickness at its juncture with the body due to the termination of the inner ends of the slots and the inner end of the socket relatively close to the said under face of the body whereby the said jaw is of increased resiliency.

In testimony whereof I affix my signature.

TREVILLIE O. MARTIN. [L. S.]

Copies of this patent may be obtained for five cents each, by addressing the "Commissioner of Patents, Washington, D. C."